(12) United States Patent
Sterle

(10) Patent No.: US 8,292,275 B2
(45) Date of Patent: Oct. 23, 2012

(54) MAGNETIC CLIP ASSEMBLY FOR MANUFACTURE OF DYNAMOELECTRIC MACHINE

(75) Inventor: John Thomas Sterle, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 585 days.

(21) Appl. No.: 12/565,204

(22) Filed: Sep. 23, 2009

(65) Prior Publication Data
US 2011/0068525 A1    Mar. 24, 2011

(51) Int. Cl.
B25B 11/00    (2006.01)

(52) U.S. Cl. ................................ 269/8; 269/3

(58) Field of Classification Search ............ 269/3, 8, 269/6, 95, 131, 130
See application file for complete search history.

(56) References Cited

U.S. PATENT DOCUMENTS

| | | | |
|---|---|---|---|
| 3,079,191 A * | 2/1963 | Engelsted et al. | 294/65.5 |
| 3,143,092 A * | 8/1964 | Glassman et al. | 112/105 |
| 4,255,837 A | 3/1981 | Holtz | |
| 4,300,754 A * | 11/1981 | Lawrence | 269/8 |
| D274,127 S | 6/1984 | Einhorn et al. | |
| 4,582,749 A | 4/1986 | Boulter et al. | |
| 6,092,271 A * | 7/2000 | Stojkovic et al. | 29/281.5 |
| 6,279,885 B1 * | 8/2001 | Leon, Jr. | 269/8 |
| 6,708,964 B1 * | 3/2004 | Dedrick | 269/8 |
| D506,783 S | 6/2005 | Siegel | |
| 7,480,977 B2 | 1/2009 | Smigelski | |
| 7,618,029 B2 * | 11/2009 | Haley | 269/8 |
| 8,177,208 B2 * | 5/2012 | Sato | 269/71 |
| 2004/0263020 A1 | 12/2004 | Irwin et al. | |
| 2006/0119208 A1 | 6/2006 | Gardner et al. | |
| 2007/0085439 A1 | 4/2007 | Smigelski | |
| 2009/0051090 A1 * | 2/2009 | Barnes, Jr. | 269/8 |

FOREIGN PATENT DOCUMENTS

GB    1383179 A    2/1975

OTHER PUBLICATIONS

Search Report issued in connection with GB Application No. 1015809.5, Jan. 19, 2011.

* cited by examiner

*Primary Examiner* — Robert Canfield
*Assistant Examiner* — Brent W Herring
(74) *Attorney, Agent, or Firm* — Hoffman Warnick LLC; Ernest G. Cusick

(57) ABSTRACT

A magnetic clip assembly for use in the manufacture of an electric generator is provided. In one aspect there is a magnetic clip assembly that includes a base; a receptacle formed on a portion of the base having three side surfaces, a top surface and an opening formed therein with a pinching area to receive and secure an inserted material of varying thickness; a first tab formed on the top surface of the receptacle extending away from the opening; a first magnet coupled to a surface of the first tab; and a second magnet coupled to the first tab at an opposing surface of the tab containing the first magnet.

18 Claims, 4 Drawing Sheets

MAGNETIC CLIP ASSEMBLY FOR MANUFACTURE OF DYNAMOELECTRIC MACHINE

BACKGROUND OF THE INVENTION

The present invention relates generally to magnetic clip devices and more particularly to a magnetic clip assembly for use in the manufacture of a dynamoelectric machine such as an electric generator.

A typical electric generator includes a rotor mounted within a stator. The rotor is an electromagnet that includes a multiple of field coils having a plurality of turns (windings or layers) typically made of copper or aluminum. A body of the rotor, typically made of steel, includes a multiple of axial slots disposed therein. The plurality of turns of field coils are arranged within each of these axial slots. Each of the field coils is electrically and mechanically isolated from the axial slots by slot insulation known as slot armor. The slot insulation serves to position and protect the field coils from electrical contact with the rotor body. Specifically, the slot insulation isolates the sides of the field coils. The field coils produce a magnetic flux pattern when supplied with electrical current. A turbine (e.g., a gas or steam turbine) rotates the rotor including the field coils such that the magnetic flux pattern interacts with windings of the stator to generate electric power.

During the manufacturing of an electric generator, a problem can arise during the winding (assembly process) of the field coils (i.e., placement of the coil windings in the axial slots against the side surfaces of the slot insulation). In particular, the slot insulation tends to become damaged (i.e., broken or frayed) as the turns of field coils are installed in the axial slots. That is, the turns of field coils contact edges of the slot insulation during installation and sometimes break or fray the slot insulation, necessitating replacement of the insulation. Because the ends of each installed field coil have to be brazed, the labor costs in unbrazing and removing the coils in order to replace damaged slot insulation can be excessive especially if multiple turns of a coil have already been installed in the axial slots. In addition to excessive labor costs, there are delays in manufacturing the electric generators when it becomes necessary to replace slot insulation.

BRIEF DESCRIPTION OF THE INVENTION

Therefore, it is desirable to minimize or eliminate, in most cases, the damage that is caused to the slot insulation during the manufacturing winding process of electric generators.

In one aspect of the present invention, a magnetic clip assembly is provided. The magnetic clip assembly comprises a base; a receptacle formed on a portion of the base having three side surfaces, a top surface and an opening formed therein with a pinching area to receive and secure an inserted material of varying thickness; a first tab formed on the top surface of the receptacle extending away from the opening; a first magnet coupled to a surface of the first tab; and a second magnet coupled to the first tab at an opposing surface of the tab containing the first magnet.

In another aspect of the present invention, a magnetic clip assembly for use in the manufacture of a dynamoelectric machine is provided. In this aspect of the present invention, the dynamoelectric machine has a rotor body with a plurality of slots disposed therein with field coils arranged in each of the plurality of slots. Each of the plurality of slots has slot insulation located against side surfaces of the slots. The slot insulation separates the field coils from the side surfaces of each of the plurality of slots. In this aspect of the present invention, the magnetic clip assembly comprises a base; a receptacle formed on a portion of the base having three side surfaces, a top surface and an opening formed therein with a pinching area to receive and secure a corner of slot insulation within a side surface of one of the plurality of slots; a first tab formed on the top surface of the receptacle extending away from the opening; a first magnet coupled to a surface of the first tab, the first magnet configured to fasten to the rotor body at a first location; and a second magnet coupled to the first tab at an opposing surface of the tab containing the first magnet, the second magnet configured to fasten to the rotor body at a second location away from the first location.

In a third aspect of the present invention, a method of winding a dynamoelectric machine having a rotor body with a plurality of slots disposed therein is disclosed. In this aspect of the present invention, the method comprises: placing slot insulation against each side surface of each of the plurality of slots in the rotor body; securing the slot insulation against the side surfaces of each of the plurality of slots with a magnetic clip assembly configured to receive and secure the slot insulation, the magnetic clip assembly securing the slot insulation down into each of the plurality of slots, radially against the side surface of each of the plurality of slots and axially with respect to each of the plurality of slots; and installing a plurality of field coil turns in each of the plurality of slots as the magnetic clip assembly secures the slot insulation.

DETAILED DESCRIPTION OF THE INVENTION

Various embodiments of the present invention include using the magnetic clip assembly described herein to receive and secure slot insulation against the side surfaces of axial slots disposed in a rotor body of a dynamoelectric machine such as an electric generator, as a multitude of field coil turns are arranged in each of the slots. Technical effects of the various embodiments of the present invention include improving the manufacturing winding process of an electric generator by minimizing or eliminating the damage to the slot insulation. Other technical effects include minimizing or eliminating, in most cases, the damage caused by post winding slot insulation adjustments required due to the insulation shifting during the winding process.

Although the various embodiments of the present invention are directed to using the magnetic clip assembly described herein with a large electric generator configuration, embodiments of the present invention are suitable for use with smaller electric generator configurations that use slot insulation.

Figure 1:
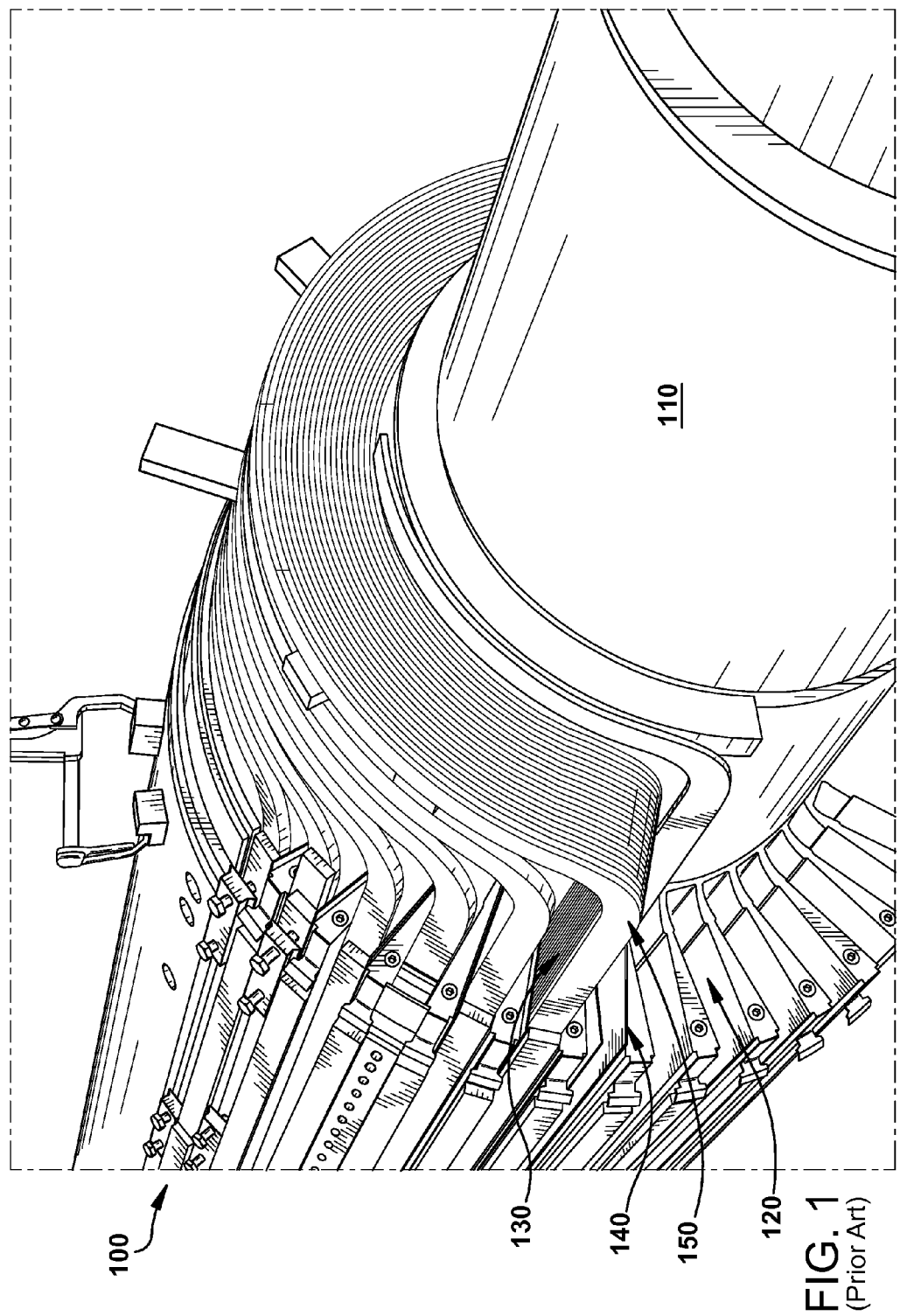
FIG. 1 is a three-dimensional perspective view of a portion of a rotor for use in a dynamoelectric machine such as an electric generator according to the prior art.

Referring to the drawings, FIG. 1 is a three-dimensional perspective view of a portion of a rotor 100 for use in a dynamoelectric machine such as an electric generator according to the prior art. Rotor 100 includes a rotor body 110 that can be made of a ferrous metal material includes a multiple of axial slots 120 disposed therein. Note that although the slots are described herein as axial in that the slots extend axially along the rotor body 110, those skilled in the art recognize that the slots can also be described as radially in that slots extend radially from rotor body. A multiple of field coil turns 130 that can be made of copper or aluminum are arranged within each of these axial slots 120. Slot insulation 140 is located against the side surfaces of each of the axial slots 120. The slot insulation 140 electrically and mechanically isolates the field coils 130 by positioning and protecting the coils from electrical contact with the rotor body 110. As shown in FIG. 1, the field coils 130 extend beyond the slot insulation 140 to form end turns 150 for interconnection of the coils into a continuous electrical circuit. In a large electric generator, there may be about 32 axial slots disposed in a rotor body and any where from 10 to 14 turns of field coils installed in each slot. In operation, the field coils 130 produce a magnetic flux pattern when supplied with electrical current. A turbine such as a gas or steam turbine (not shown) rotates the rotor 100 including the rotor body 110 and field coils 130 so that the magnetic flux pattern interacts with windings of a stator in the generator (not shown) to generate electric power.

Those skilled in the art will recognize that rotor 100 can have more componentry than what is illustrated in FIG. 1 and described herein for use with a dynamoelectric machine such as an electric generator. For example, rotor 100 may have a shaft to rotate the rotor body 110 and ducts used to deliver a coolant to the field coils 130.

As mentioned above, the manufacture process of winding the rotor 100 of an electric generator with the field coils 130 often results in damage to the slot insulation 140 after the insulation has been placed against the side surfaces of the axial slots 120. More specifically, the slot insulation 140 tends to become damaged (i.e., broken or frayed) at its corners by contact with the field coil turns 130 as the coils are installed in the axial slots 120. This contact typically results in the edges of the slot insulation 140 to break or fray, necessitating replacement of the insulation. The damage caused to the slot insulation 140 by the winding of the field coils is exacerbated by the tendency for the insulation to fall in on itself as it is placed against the side surfaces of the axial slots 120. To replace the damaged slot insulation, it becomes necessary to unbraze the field coils 130 and remove them from the axial slots 120. In some instances, the labor costs in uninstalling the field coils and resulting delays in manufacturing can be excessive.

Various embodiments of the present invention as disclosed herein have overcome this problem (i.e., the damage to the slot insulation) brought about by installing the field coils 130 in the axial slots 120 by using a specially designed magnetic clip assembly to protect and position the slot insulation 140 during the manufacturing process of winding the coils. As shown herein, the magnetic clip assembly locates and secures the slot insulation 140 in three positions: down into the slot, radially against the side surface of the slot wall, and axially with respect to the slot. With the slot insulation 140 secured and its corners protected, the turns of field coils 130 can be inserted into the axial slots 120 during the winding process without striking the edges of the insulation and damaging or moving it out of location.

Figure 4:
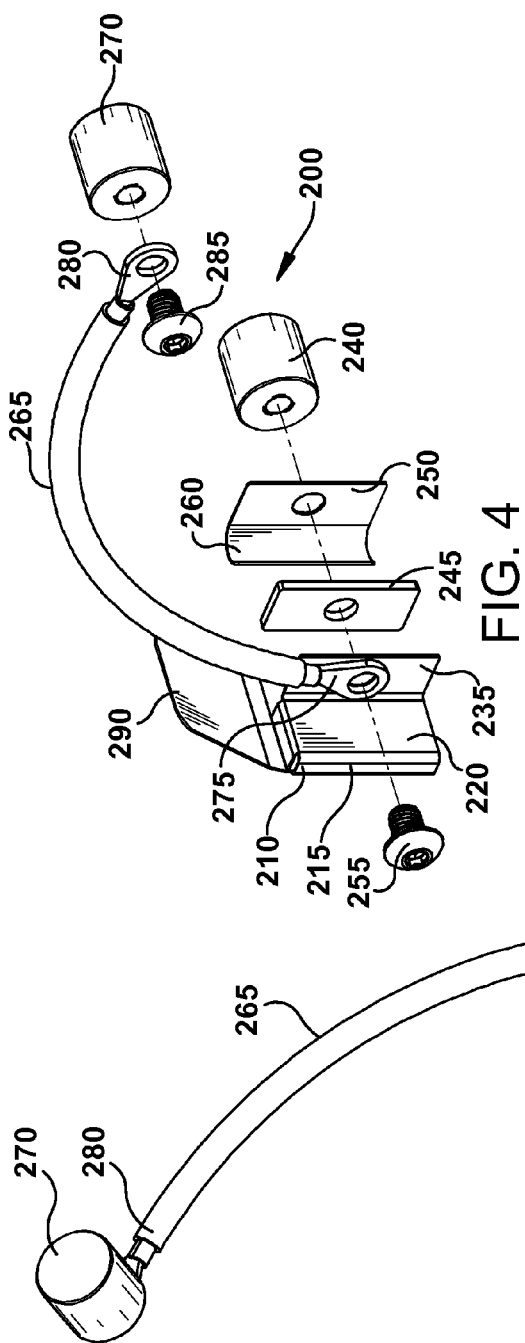
FIGS. 2-4 illustrate a magnetic clip assembly used to secure slot insulation depicted in FIG. 1 against the side surfaces of each of the axial slots as field coils are arranged therein according to one embodiment of the present invention.
Figure 3:
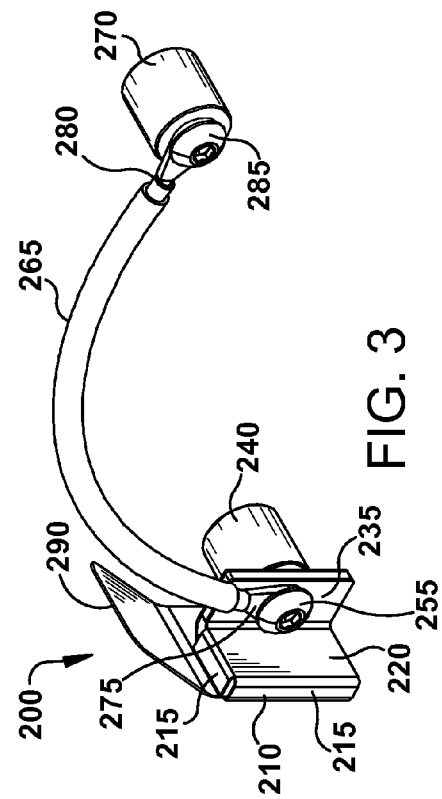
Figure 2:
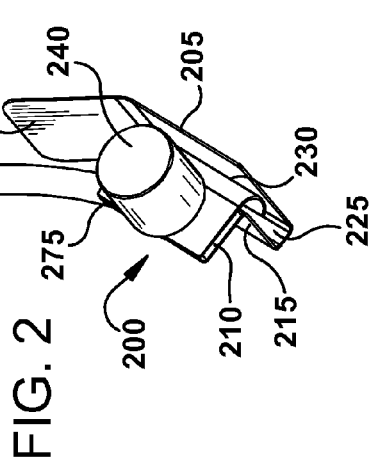

FIGS. 2-4 provide several views of a magnetic clip assembly 200 used to secure the slot insulation against the side surfaces of each of the axial slots as the field coils are arranged therein according to one embodiment of the present invention. In particular, FIGS. 2-3 show perspective views of the magnetic clip assembly 200 from different angles and FIG. 4 shows an exploded view diagram illustrating the relationship or order of assembly of the various components that form the magnetic assembly. As shown in FIGS. 2-4, the magnetic clip assembly 200 comprises a base 205 that in one embodiment is formed from a thin sheet of metal. A receptacle 210 is formed on a portion of the base 205. In one embodiment, the receptacle 210 has three side surfaces 215, a top surface 220 and an opening 225 formed therein. Within the opening 225 is a pinching area 230 that is configured to receive and secure an inserted material of varying thickness such as slot insulation that is installed against the side surfaces of axial slots disposed in a rotor body of a rotor used with an electric generator. The base 205 comprises an angled portion that provides a protective slide surface to facilitate the receptacle 210 receiving the slot insulation through the opening 225.

A tab 235 is formed on the top surface of the receptacle 210 extending away from the opening 230. In one embodiment, the tab 235 is for attachment of the remaining components of the magnetic clip assembly 200. In particular, a magnet 240 is coupled to a surface of the tab 235. As shown in FIGS. 2-4, magnet 240 couples to the surface of the tab 235 via a spacer 245 and a sheet clip 250. In one embodiment, the spacer 245 and sheet clip 250 are made of a metal material. As shown in FIG. 4, the tab 235, spacer 245, and sheet clip 250 each have openings formed therein to be coupled together by a fastening means 255 (e.g., a screw) that is threaded complementary to mate with the openings formed in the tab, spacer, sheet clip, and thread in magnet 240. Further, as shown in FIG. 4, the spacer 245, is assembled to be affixed to one surface of the tab 235, and the sheet clip is assembled to be affixed between the spacer and magnet 240. The sheet clip 250 has a portion 260 that is slidable within the opening 225 of the receptacle 210 to form the pinching area 230 that captures the slot insulation.

Attached to the other surface of the tab 235, opposite the spacer 245, the sheet clip 250 and the magnet 240, is a tether device 265 that couples a second magnet 270 to the tab 235. In one embodiment, the tether device 265 is a flexible wire cable having a first end 275 and a second end 280. As shown in FIGS. 2-4, the first end 275 fastens to the tab 235 and the second end 280 is coupled to the second magnet 270. In one embodiment, the first end 275 of the tether device 265 has an opening formed therein to be coupled together by a fastening means 255 (e.g., a screw) that is threaded complementary to mate with the openings formed in the end 275, while the second end 280 of the tether device has an opening formed therein to be coupled together by a fastening means 285 (e.g., a screw) that is threaded complementary to mate with the opening formed in the end and threaded magnet 270.

In one embodiment, where the tether device 265 comprises a flexible wire cable, a heat shrink tubing may be placed around the cable. The heat shrink tubing may be colored to facilitate easy identification of the magnetic clip assembly 200. Thus, after the winding manufacture process is complete, the colored heat shrink tubing can be used as an identifier to prevent the magnetic clip assembly 200 from being left on the electric generator after completing the manufacture process. Also, color-coding may be useful in quickly identifying one clip assembly from a mirror image magnetic clip assembly, which as explained below, pairs of these clip assemblies 200 are typically used in the winding of the rotor body with the turns of field coils.

Those skilled in the art will recognize that other devices besides a flexible wire cable can be used to couple magnet 270 to the tab 235. For example, a mechanical clamp could be used as an alternative. Thus, the various embodiments of the present invention are not meant to be limited solely to use of the flexible wire cable.

Referring back to FIGS. 2-4, the magnetic clip assembly 200 is shown to further include a second tab 290 formed on the base 205 extending away from the receptacle 210, such that it extends away from the tab 235 forming an angle therebetween that is less than 90 degrees. In one embodiment, the second tab 290 is a thin sheet of metal that is angled away from the base 205 that acts as a guide for the insertion of each field coil turn upon attachment of the magnetic clip assembly to the slot insulation. In addition, the tab 290 can be used to facilitate attachment and removal of the magnetic clip assembly 200 from the corners of the slot insulation in the axial slots disposed in the rotor body.

Upon assembly of the components of the magnetic clip device 200, the magnet 240 is ready to be used as a manufacturing aid to protect and position the slot insulation during the manufacturing process of winding a rotor body with the field coils. In particular, the magnetic clip assembly 200 can be secured on the top corners of the slot insulation via its receptacle 210. After attaching the receptacle 210 to the top corners of the slot insulation, the magnet 240 is configured to be affixed to a first location on the ferrous metal material of the rotor body in order to hold the magnetic clip assembly 200 in position on the rotor body. In addition, the magnet 270 is configured to be affixed to another location on the ferrous metal material of the rotor body in order to provide added security in holding the magnetic clip assembly 200 in position on the rotor body in the event that the clip assembly is pushed off the slot insulation unintentionally.

A more detailed explanation of a manufacture process of winding a rotor body with field coils for use in a large electric generator with the use of the magnet clip assembly 200 is now described according to one embodiment of the present invention. In this embodiment, the manufacture process of winding a rotor body having a multiple of axial slots disposed therein begins by placing slot insulation against each side surface of a slot that forms the multiple of axial slots. After placement of the slot insulation against each side surface of the slots in the rotor body, the magnetic clip assembly is used to secure the slot insulation against each side surface of each of the axial slots. In particular, the magnetic clip assembly 200 is secured on each of the top corners of the slot insulation via the receptacle 210 formed in the clip assembly. For each magnetic clip assembly 200 used in the manufacture process, the magnet 240 of the clip assembly is affixed to a first location on the ferrous metal material of the rotor body in order to hold the clip assembly in position on the rotor body. In addition, the magnet 270 via the tether device 265 is affixed to another location on the ferrous metal material of the rotor body in order to provide added security in holding the magnetic clip assembly 200 in position on the rotor body in the event that the clip assembly is pushed off the slot insulation unintentionally during the installation of the field coils. Once the magnetic clip assembly 200 is secured to each side surface, the slot insulation is essentially secured in three positions: down into the axial slot, radially against the side surface of the slot, and axially with respect to the slot.

With all of the slot insulation secured and their corners protected with the magnetic clip assemblies, the turns of field coils can be inserted into each axial slot without damaging the slot insulation or moving it out of location. In particular, using the tab 290, which is the upper most angled portion of the magnetic clip assembly 200, as a guide, each field coil turn can be installed in each of the multiple of axial slots. Once all of the field coils have been installed in each of the axial slots of the rotor body, the magnetic clip assemblies 200 can be removed from the corners of the slot insulation.

The use of the magnetic clip assembly 200 during the manufacture winding process of a rotor body with field coils for use in an electric generator, minimizes or eliminates, in most cases, the damage that can be caused to the slot insulation during the manufacturing winding process by securing and locating the insulation in a position that protects the insulation from the field coil turns striking the ends during the installation. It will also minimize or eliminate, in most cases, the damage caused by post winding slot insulation adjustments required due to the insulation shifting during the winding process. As a result, the use of the magnetic clip assembly 200 improves the assembly of the field coils in the slots of the rotor body by minimizing or eliminating damage to the slot insulation, which minimizes or eliminates costs and delays of manufacture due to insulation damage.

The foregoing description of the manufacture winding process of a rotor body with field coils for use in an electric generator describes some of the processing acts associated with winding a rotor. It should also be noted that in some alternative implementations, the acts noted may occur out of the order described herein or, for example, may in fact be performed substantially concurrently or in the reverse order, depending upon the act involved. Also, one of ordinary skill in the art will recognize that additional acts that describe the winding process may be added to the description.

Figure 5:
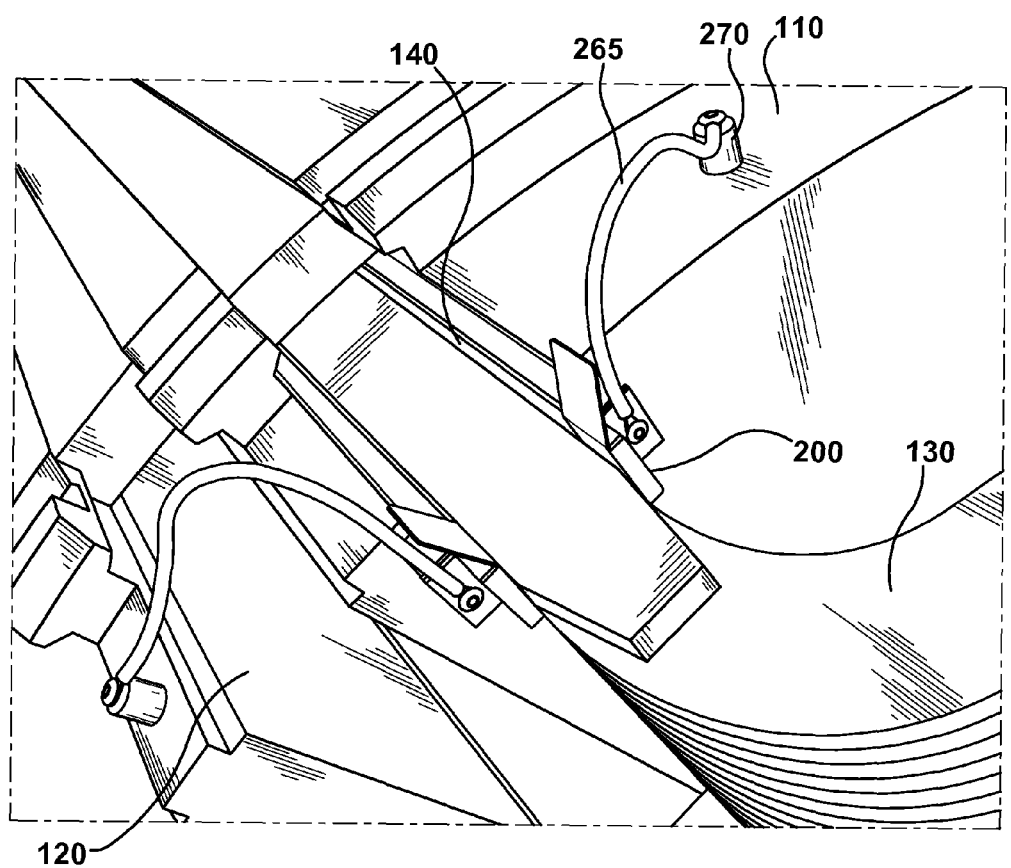
FIG. 5 is an illustration showing the magnetic clip assembly of FIGS. 2-4 fastened to the slot insulation and rotor body of an electric generator according to one embodiment of the present invention.

FIG. 5 is a schematic illustration showing the magnetic clip assembly 200 of FIGS. 2-4 fastened to the slot insulation 140 of an electric generator like the one depicted in FIG. 1 according to one embodiment of the present invention. As shown in FIG. 5, the magnetic clip assembly 200 is secured on the top corners of the slot insulation 140 via its receptacle. In addition, the magnet 240 is affixed to the ferrous metal material of the rotor body 110 at a first position (e.g., against the axial slots), while magnet 270 is affixed to the rotor body at another location via the tether device 265. FIG. 5 also shows the relationship between the magnetic clip assembly 200 and slot insulation 140 with the axial slot 120 and field coils 130. In addition, FIG. 5 shows that there are two magnetic clip assemblies 200 in use. These magnetic clip assemblies are mirror images of each other. Each magnetic clip assembly 200 functions to secure the slot insulation 140 against a respective side surface of the axial slot 120.

Figure 6:
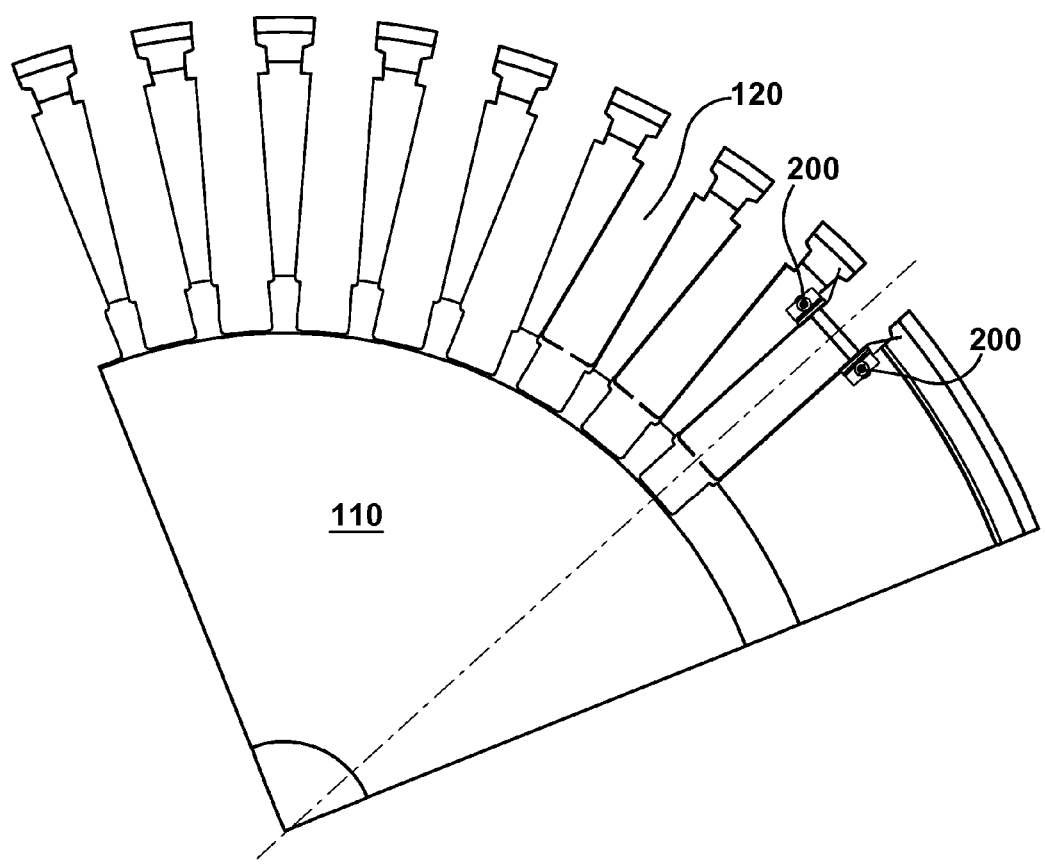
FIG. 6 is a schematic sectional view showing the magnetic clip assembly depicted in FIGS. 2-4 in use with a rotor body of an electric generator like the one depicted in FIG. 1 according to one embodiment of the present invention.

FIG. 6 is a schematic sectional view showing the magnetic clip assembly 200 depicted in FIGS. 2-4 in use with a rotor body 110 of an electric generator like the one depicted in FIG. 1 according to one embodiment of the present invention. As shown in FIG. 6, there are two magnetic clip assemblies 200 shown in use in one axial slot 120. Those skilled in the art will recognize that during the manufacture winding process, the axial slots 120 would also have two magnetic clip assemblies secured at opposing respective ends. After all of the field coil turns have been installed in a slot, then the magnetic clip assemblies 200 could be removed and secured to the next slot to be wound with field coil. This process would continue until all of the slots have been installed with the field coils.

While the disclosure has been particularly shown and described in conjunction with a preferred embodiment thereof, it will be appreciated that variations and modifications will occur to those skilled in the art. Therefore, it is to be understood that the appended claims are intended to cover all such modifications and changes as fall within the true spirit of the disclosure.

What is claimed is:

1. A magnetic clip assembly, comprising:
   a base;
   a receptacle formed on a portion of the base having three side surfaces, a top surface and an opening formed therein with a pinching area to receive and secure an inserted material of varying thickness;
   a first tab formed on the top surface of the receptacle extending away from the opening;
   a first magnet coupled to a surface of the first tab;
   a second magnet coupled to the first tab at an opposing surface of the tab containing the first magnet; and
   a tether device that couples the second magnet to the first tab.

2. The magnetic clip assembly according to claim 1, wherein the base comprises a protective slide surface to facilitate the receptacle receiving the inserted material of varying thickness through the opening, protecting a corner of the material from damage.

3. The magnetic clip assembly according to claim 1, wherein the tether device is a flexible wire cable having a first end and a second end, the first end fastens to the first tab and the second end is coupled to the second magnet.

4. The magnetic clip assembly according to claim 1, further comprising a spacer located between the first magnet and the first tab.

5. The magnetic clip assembly according to claim 4, further comprising a sheet clip located between the spacer and the first magnet, the sheet clip having a portion slidable within the opening of the receptacle to form the pinching area.

6. The magnetic clip assembly according to claim 1, further comprising a second tab formed on the base extending away from a side surface of the receptacle, wherein the second tab extends away from the first tab.

7. A magnetic clip assembly for use in the manufacture of a dynamoelectric machine having a rotor body with a plurality of slots disposed therein with field coils arranged in each of the plurality of slots, each of the plurality of slots having slot insulation located against side surfaces of the slots, the slot insulation separating the field coils from the side surfaces of each of the plurality of slots, the magnetic clip assembly comprising:
   a base;
   a receptacle formed on a portion of the base having three side surfaces, a top surface and an opening formed therein with a pinching area to receive and secure a corner of slot insulation within a side surface of one of the plurality of slots, wherein the receptacle receives and secures the slot insulation down into the slot, radially against the side surface of the slot, and secures the slot insulation from shifting axially with respect to the slot;
   a first tab formed on the top surface of the receptacle extending away from the opening;
   a first magnet coupled to a surface of the first tab, the first magnet configured to fasten to the rotor body at a first location; and
   a second magnet coupled to the first tab at an opposing surface of the tab containing the first magnet, the second magnet configured to fasten to the rotor body at a second location away from the first location.

8. The magnetic clip assembly according to claim 7, wherein the base comprises a protective slide surface to facilitate the receptacle receiving the corner of slot insulation through the opening, protecting the corner of the slot insulation from damage upon insertion of the field coils in each of the plurality of slots.

9. The magnetic clip assembly according to claim 7, further comprising a tether device that couples the second magnet to the first tab.

10. The magnetic clip assembly according to claim 9, wherein the tether device is a flexible wire cable having a first end and a second end, the first end fastens to the first tab and the second end is coupled to the second magnet.

11. The magnetic clip assembly according to claim 7, further comprising a spacer located between the first magnet and the first tab.

12. The magnetic clip assembly according to claim 11, further comprising a sheet clip located between the spacer and the first magnet, the sheet clip having a portion slidable within the opening of the receptacle to form the pinching area.

13. The magnetic clip assembly according to claim 7, further comprising a second tab formed on the base extending away from the receptacle, wherein the second tab extends away from the first tab.

14. The magnetic clip assembly according to claim 7, further comprising a second tab formed on the base extending away from the receptacle, wherein the second tab extends away from the first tab, forming an angle therebetween that is less than 90 degrees.

15. The magnetic clip assembly according to claim 7, wherein the first magnet and second magnet are configured to be fastened to the rotor body prior to arranging the field coils in each of the plurality of slots.

16. The magnetic clip assembly according to claim 15, wherein the first magnet and second magnet are configured to be removably detached from the rotor body upon arranging the field coils in each of the plurality of slots.

17. The magnetic clip assembly according to claim 7, wherein the receptacle is secured to the corner of the slot insulation prior to arranging the field coils in each of the plurality of slots.

18. The magnetic clip assembly according to claim 17, wherein the receptacle is configured to be released from the corner of the slot insulation upon arranging the field coils in each of the plurality of slots.

* * * * *